United States Patent Office 3,153,064
Patented Oct. 13, 1964

3,153,064
16β-LOWER ALKYLTHIO-1,4-DIHYDRO - 3,17β-
ESTRADIOL 3-LOWER ALKYL ETHER AND
PRODUCTION THEREOF
Norio Tokutake, Hyogo Prefecture, Japan, assignor to
Shionogi & Co., Ltd., Osaka, Japan
No Drawing. Filed Mar. 1, 1963, Ser. No. 262,210
Claims priority, application Japan Mar. 10, 1962
2 Claims. (Cl. 260—397.5)

The present invention relates to 16β-lower alkylthio-1,4-dihydro-3,17β-estradiol 3-lower alkyl ether and production thereof.

The said 16β-lower alkylthio-1,4-dihydro-3,17β-estradiol 3-lower alkyl ether is represented by the formula:

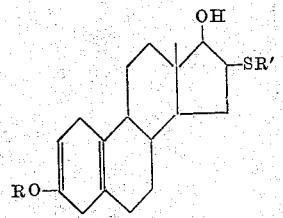

(I)

wherein R and R' each represents a lower alkyl group (e.g. methyl, ethyl, propyl, butyl). This compound (I) possesses a variety of physiological activities such as antidiuretic activity, electrolytes retaining activity, uterotropic activity, antiprogestational activity and pituitary gonadotrophin inhibiting activity. Accordingly, it is useful as an artificial hormonic substance.

The 16β-lower alkylthio-1,4-dihydro-3,17β-estradiol 3-lower alkyl ether (I) is prepared by subjecting 16β-lower alkylthio-3,17β-estradiol 3-lower alkyl ether to reduction. The starting material, 16β-lower alkylthio-3,17β-estradiol 3-lower alkyl ether, is represented by the formula:

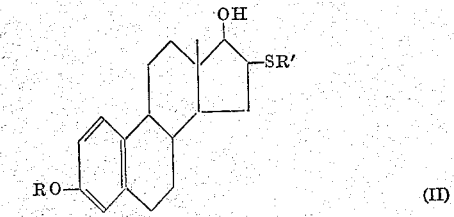

(II)

wherein R and R' each has the same significance as designated above and can be prepared from a known steroid, 16α-bromo-estrone 3-lower alkyl ether [Johnson et al.: J. Am. Chem. Soc., vol. 79, p. 2005 (1957)], according to the following scheme:

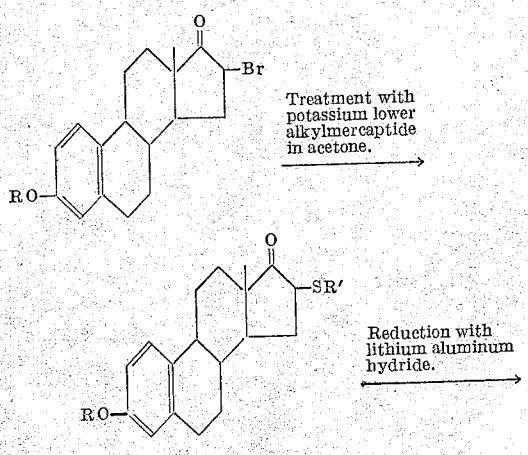

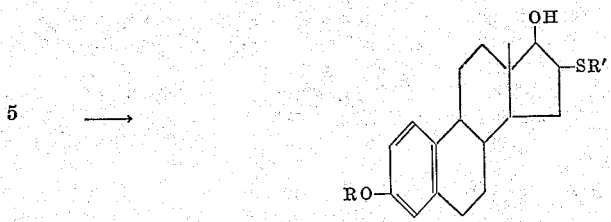

wherein R and R' each has the same significance as designated above. The reduction may be carried out by treating the starting compound (II) with an alkali metal (e.g. lithium, sodium, potassium) in the presence of a lower alkanol (e.g. methanol, ethanol) in liquid ammonia at a low temperature, usually while cooling with acetone-Dry Ice.

The thus-obtained 16β-lower alkylthio-1,4-dihydro-3,17β-estradiol 3-lower alkyl ether (I) possesses a variety of physiological activities as stated above. Its remarkable pituitary gonadotrophin inhibiting activity may be especially noted. For instance, the compound produced marked inhibition of gonadotrophin secretion at the dosage up to 10 mg. and showed increase of uterine weight, when subcutaneously or orally administered to mice.

The following examples set forth illustratively presently-preferred embodiments of the present invention.

Example 1

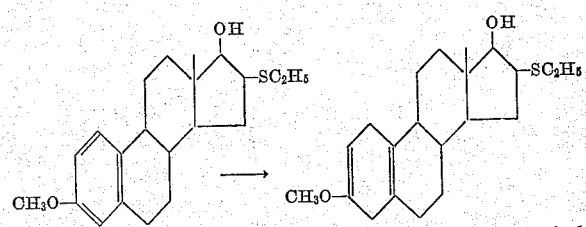

A solution of 16β-ethylthio-3,17β-estradiol 3-methyl ether (700 mg.) in anhydrous ether (160 ml.) is dropwise added to liquid ammonia (280 ml.) while cooling with acetone-Dry Ice. After addition of metallic lithium (2 g.), the resultant dark blue mixture is stirred for 25 minutes and anhydrous ethanol is dropwise added thereto until the colour disappears. After evaporation of ammonia, the reaction mixture is shaken with ether. The ether extract is shaken with 5% potassium hydroxide and water in order, dried and evaporated. The colorless viscous residue is crystallized from a mixture of acetone and petroleum ether to give 16β-ethylthio-1,4-dihydro-3,17β-estradiol 3-methyl ether (434 mg.) as white colorless needles melting at 130.5 to 131° C. [α]$_D^{22}$+46.9° (CHCl$_3$).

$\nu_{max.}^{CCl_4}$ 3530, 1696, 1670 cm.$^{-1}$

Analysis.—Calcd. for C$_{21}$H$_{32}$O$_2$S: C, 72.36; H, 9.25; S, 9.18. Found: C, 72.30; H, 9.40; S, 8.76.

Example 2

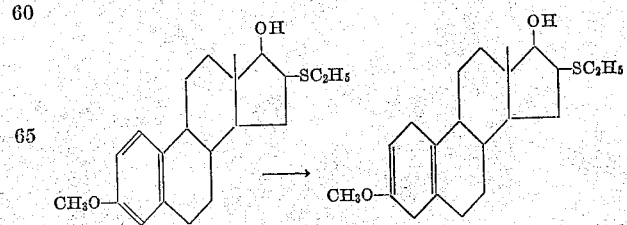

A solution of 16β-ethylthio-3,17β-estradiol 3-methyl ether (400 mg.) in anhydrous ether (92 ml.) and anhydrous ethanol (0.14 ml.) is dropwise added within 5 minutes to a solution of metallic lithium (0.64 g.) in liquid ammonia (80 ml.) while cooling with acetone-Dry Ice. After stirring the resultant dark blue mixture for 5 minutes, anhydrous ethanol is dropwise added thereto until the colour disappears. After evaporation of ammonia, the reaction mixture is shaken with ether. The ether extract is shaken with 5% potassium hydroxide and water in order, dried and evaporated. The residue is crystallized from ether to give 16β-ethylthio-1,4-dihydro-3,17β-estradiol 3-methyl ether (300 mg.) as white plates melting at 130.5 to 131.5° C.

What is claimed is:
1. 16β-lower alkylthio - 1,4 - dihydro - 3,17β - estradiol 3-lower alkyl ether.
2. 16β-ethylthio-1,4-dihydro-3,17β - estradiol 3 - methyl ether.

References Cited in the file of this patent

Magerlein et al.: Journal of Amer. Chem. Soc., vol. 80 (1958), pages 2296–2297.

Fieser et al.: Steroids (1959), published by Reinhold Publishing Corp., New York, pages 588–9.